US009651155B2

(12) United States Patent
Angiulli et al.

(10) Patent No.: US 9,651,155 B2
(45) Date of Patent: May 16, 2017

(54) GASKET

(71) Applicant: FREUDENBERG SEALING TECHNOLOGIES S.A.S. DI EXTERNA ITALIA S.R.L.U, Pinerolo (IT)

(72) Inventors: Pasquale Angiulli, Pinerolo (IT); Luca Breusa, Pinerolo (IT); Massimo Barban, Pinerolo (IT); Stefano Miletto, Pinerolo (IT); Maurizio Buro, Pinerolo (IT)

(73) Assignee: FREUDENBERG SEALING TECHNOLOGIES S.A.S. DI EXTERNA ITALIA S.R.L.U (IT)

( * ) Notice: Subject to any disclaimer, the term of this patent is extended or adjusted under 35 U.S.C. 154(b) by 0 days.

(21) Appl. No.: 15/091,914

(22) Filed: Apr. 6, 2016

(65) Prior Publication Data

US 2016/0298771 A1    Oct. 13, 2016

(30) Foreign Application Priority Data

Apr. 7, 2015    (IT) .............................. TO2015A0202

(51) Int. Cl.
*F16J 15/32*    (2016.01)
*F16J 15/3284*    (2016.01)
(Continued)

(52) U.S. Cl.
CPC ....... *F16J 15/3284* (2013.01); *F16C 33/7823* (2013.01); *F16J 15/3232* (2013.01); *F16J 15/3256* (2013.01); *F16J 15/3268* (2013.01)

(58) Field of Classification Search
CPC .. F16J 15/3204; F16J 15/3208; F16J 15/3212; F16J 15/3216; F16J 15/3232;
(Continued)

(56) References Cited

U.S. PATENT DOCUMENTS 6,315,296 B1 * 11/2001 Oldenburg ........... F16J 15/3256
277/353
6,450,503 B1 * 9/2002 Dossena .............. F16J 15/3256
277/549

(Continued)

FOREIGN PATENT DOCUMENTS

| EP | 1055850 | 11/2000 |
|---|---|---|
| EP | 2799743 | 11/2014 |
| JP | 2010265949 | 11/2010 |

OTHER PUBLICATIONS

Corresponding Italian Search Report for IT TO20150202 dated Nov. 23, 2015.

*Primary Examiner* — Gilbert Lee
(74) *Attorney, Agent, or Firm* — The Belles Group, P.C.

(57) ABSTRACT

A gasket for sealing a compartment between rotating and fixed members. The gasket has a first ring adapted to be connected to a rotating member; a second ring adapted to be connected to a fixed member; a first annular elastomeric element carried by the first ring and defining at least a first annular sealing lip cooperating with the second ring to counter the passage of external contaminants inside the compartment; a second annular elastomeric element carried by the second ring and defining at least a second annular sealing lip cooperating with the first ring to counter the passage of lubricant to the outside; and an annular wiper member connected to the first elastomeric element and having a wiping portion cooperating with the second fixing portion of the second support ring to counter the passage of external contaminants from the second ambient to the first sealing lip.

19 Claims, 4 Drawing Sheets

(51) Int. Cl.
  *F16C 33/78* (2006.01)
  *F16J 15/3232* (2016.01)
  *F16J 15/3256* (2016.01)
  *F16J 15/3268* (2016.01)

(58) Field of Classification Search
  CPC .. F16J 15/3236; F16J 15/3248; F16J 15/3252; F16J 15/3256; F16J 15/3268
  See application file for complete search history.

(56) References Cited

U.S. PATENT DOCUMENTS

| | | | |
|---|---|---|---|
| 6,692,007 B2* | 2/2004 | Oldenburg | F16J 15/3256 277/353 |
| 6,726,212 B2* | 4/2004 | Oldenburg | F16J 15/3256 277/353 |
| 7,658,386 B2* | 2/2010 | Oldenburg | F16J 15/3256 277/353 |
| 9,133,937 B1* | 9/2015 | Reimer | F16J 15/3232 |
| 2010/0259014 A1 | 10/2010 | Nakagawa | |

\* cited by examiner

GASKET

CROSS-REFERENCE TO RELATED APPLICATIONS

The present application claims priority under 35 U.S.C. §119 to Italian Patent Application No. TO2015A000202, filed Apr. 7, 2015, the entirety of which is incorporated herein by reference.

FIELD OF THE INVENTION

The present invention relates to a sealing gasket, in particular of the cassette type, for sealing a compartment between a rotating member and a fixed member, so as to prevent the passage of lubricant from a first ambient to a second ambient, arranged on opposite sides of said compartment, and to hinder the passage of external contaminants from the second ambient to the first ambient.

BACKGROUND OF THE INVENTION

They are known cassette gaskets of the above type, suitable to be used in working vehicles, such as tractors or earth-moving machines, under extremely severe operating conditions, characterized for example by:
  intermittent operation of the motor, i.e. with continuous passages from a start condition to a stop condition and vice versa;
  continuous back and forth movements of the vehicles, with angular movements in opposite directions of the rotating members on which the cassette gaskets are applied;
  partial immersion of the vehicles in mud;
  adverse weather conditions; and
  relatively high circumferential speed of the rotating members on which the cassette gaskets are applied.

An example of a cassette gasket of the known type, having an annular shape around an axis, is shown in the patent application DE-C-19539056 and comprises:
  a first support ring having a first annular fixing portion, adapted to be connected in use to the rotating member;
  a second support ring having a second annular fixing portion, radially more external than the first fixing portion and adapted to be connected in use to the fixed member;
  a first annular elastomeric element carried by the first support ring and defining two annular sealing lips cooperating with the second fixing portion to counter, in use, the passage of external contaminants towards the ambient containing the lubricant; and
  a second annular elastomeric element carried by the second support ring and defining a further annular sealing lip cooperating with the first fixing portion of the first support ring to counter, in use, the passage of lubricant to the outside.

The second elastomeric element further comprises a further sealing lip adapted to cooperate with the first fixing portion of the first support ring to prevent external contaminants from reaching the adjacent lubricant sealing lip.

The aforesaid gaskets, although being functionally effective, are susceptible of further improvements, in particular as regards the number of working hours they can guarantee under the aforesaid severe operating conditions.

SUMMARY OF THE INVENTION

The object of the present invention is a sealing gasket, which simply and economically allows to meet the aforesaid requirement.

Said object is achieved by the present invention in that it relates to a sealing gasket as defined in claim 1.

BRIEF DESCRIPTION OF THE DRAWINGS

For a better understanding of the present invention, in the following three favourite embodiments are described, purely by way of non-limiting examples and with reference to the accompanying drawings, in which.

DETAILED DESCRIPTION OF THE INVENTION

Figure 1:
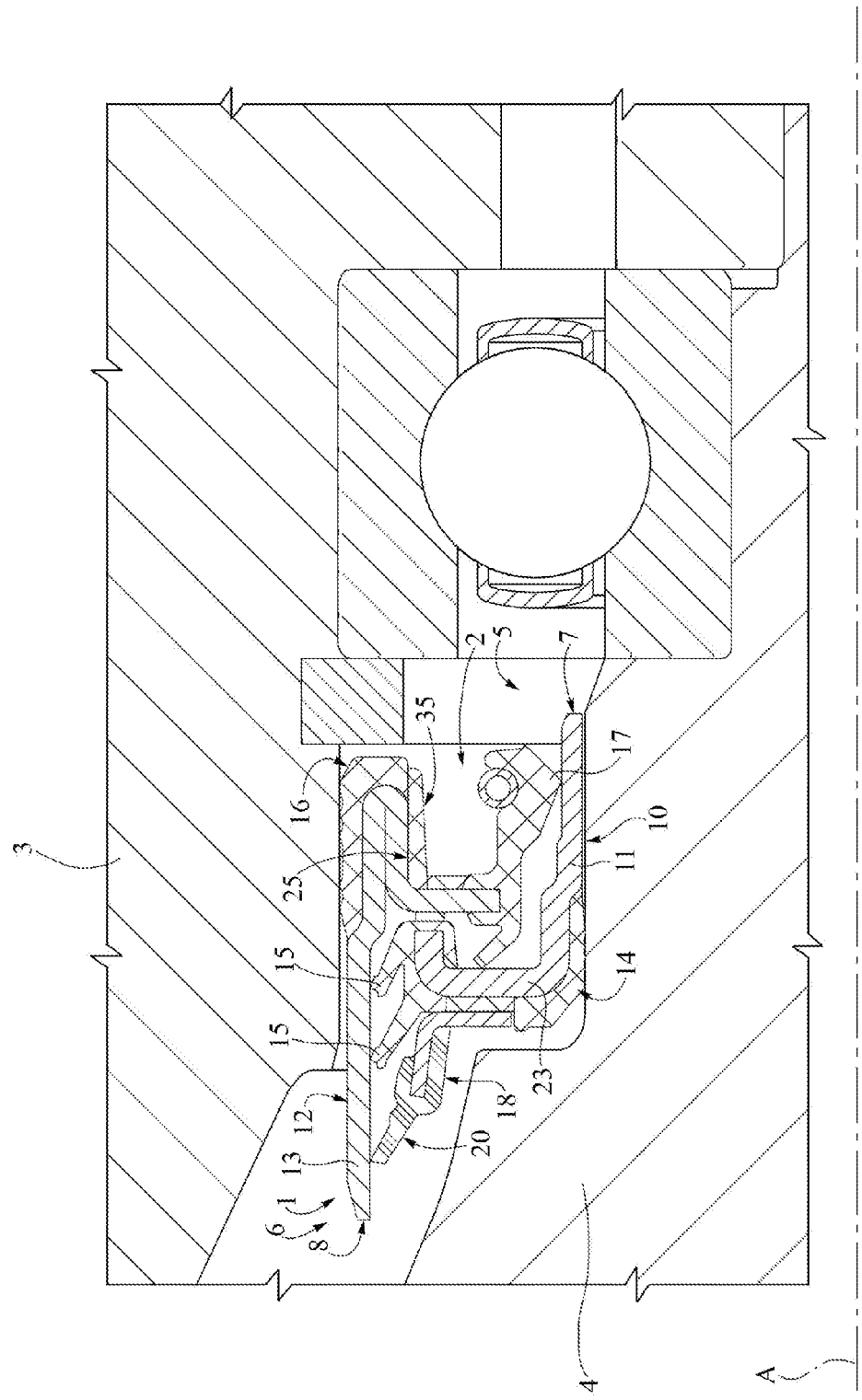
FIG. 1 is an axial half-section of a sealing gasket according to the present invention, mounted in use between a rotating member and a fixed member to seal the compartment between them.

In FIG. 1, 1 indicates as a whole a sealing gasket housed in the compartment 2 defined between an annular fixed member 3 having an axis A and a rotating member 4, for example a shaft of a vehicle, coaxially housed inside the member 3.

The compartment 2 connects two ambients 5, 6 arranged on axially opposite sides of the gasket 1 with reference to the axis A; in the shown case, the ambient 5 (to the right in FIG. 1) contains a lubricant, whereas the ambient 6 (to the left in FIG. 1) directly communicates with the outside.

The gasket 1 is adapted to seal the compartment 2 to prevent the passage of lubricant from the ambient 5 to the ambient 6, and to counter the passage of external contaminants from the ambient 6 to the ambient 5.

The gasket 1 has an annular configuration around the middle axis A and has a first and a second opposite axial end 7, 8, in use respectively facing the ambients 5 and 6.

Figure 2:
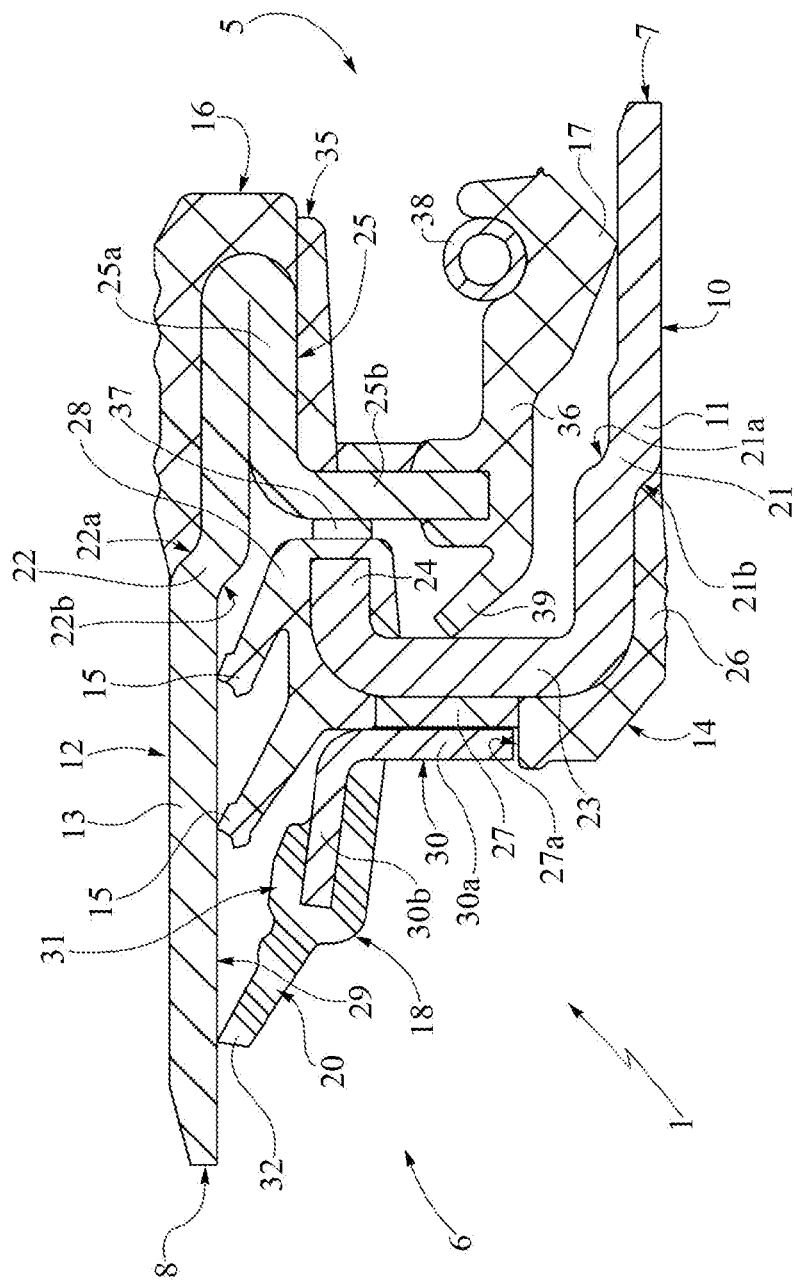
FIG. 2 is an axial half-section on an enlarged scale of the gasket of FIG. 1.

With reference to FIGS. 1 and 2, the gasket 1 comprises:
  an internal support ring 10, made of rigid material, preferably made in a single piece, having an annular fixing portion 11 adapted to be connected in use to the member 4;
  an external support ring 12, made of rigid material, preferably made in a single piece, having an annular fixing portion 13 radially more external than the fixing portion 11 and adapted to be connected in use to the member 3;
  an annular elastomeric element 14 carried by the support ring 10 and having one or more annular sealing lips 15 cooperating with the fixing portion 13 of the support ring 12 to counter, in use, the passage of external contaminants from the ambient 6 to the ambient 5; and
  an annular elastomeric element 16 carried by the support ring 12 and having one or more annular sealing lips 17 cooperating with the fixing portion 11 of the support ring 10 to counter, in use, the passage of lubricant from the ambient 5 to the ambient 6.

According to a possible alternative not shown, the member 3 may be rotating and the member 4 may be fixed.

Advantageously, the gasket 1 further comprises an annular wiper member 18, distinct from the elastomeric element 14, connected to this latter and having a wiping portion 20 cooperating with the fixing portion 13 of the support ring 12 to counter, in use, the passage of external contaminants from the ambient 6 to the sealing lips 15.

Preferably, the support rings 10, 12, 18 are made of metallic material; it is also possible that at least one of them is made of plastic material.

In the example shown in FIGS. 1 and 2, the fixing portions 11, 13 of the support rings 10, 12 extend parallel to the axis A, i.e. they have an axial development.

In the present description and in the claims, the term "axial" is used to indicate portions which extend parallel to the axis A of the gasket 1, regardless of the fact that these portions may comprise shoulders or steps of reduced size, that do not substantially modify their axial development.

In the example shown, the fixing portion 11 of the support ring 10 has a rounded intermediate step 21 defining respective annular shoulders 21a, 21b facing the axial opposite ends 7, 8 of the gasket 1; the shoulder 21b is adapted to define an axial stop for the elastomeric element 14, as better explained in greater detail below.

Analogously, the fixing portion 13 of the support ring 12 has a rounded intermediate step 22 defining respective shoulders 22a, 22b facing the axial opposite ends 7, 8 of the gasket 1; the shoulder 22a is adapted to define an axial stop for the elastomeric element 16, as better explained in greater detail below.

The fixing portion 13 of the support ring 12 axially projects with respect to the fixing portion 11 of the support ring 10 on the side facing, in use, the ambient 6 to define the axial end 8 of the gasket 1.

The support ring 10 further comprises an annular radial portion 22, overhangingly projecting towards the fixing portion 13 of the support ring 12 from one end of the fixing portion 11 adjacent to the axial end 8 of the gasket 8; moreover, the radial portion 22 is further connected to the fixing portion 11 by means of a curved section.

The support ring 10 finally comprises an annular free end portion 24, extending parallel to the axis A and to the axial end 7 of the gasket 1 from the radial portion 23 having the largest diameter; moreover, the end portion 24 is connected to the radial portion 23 by means of a curved section.

The support ring 12 further comprises an annular protruding portion 25 overhangingly projecting from the fixing portion 13 towards decreasing diameters with respect to the axis A and towards the fixing portion 11 of the support ring 10, partially facing the radial and the end portion 23, 24 of the support ring 18 and carrying the elastomeric element 16.

In particular, the protruding portion 25 extends from one end of the fixing portion 13 adjacent to the axial end 7 of the gasket 1 and comprises, proceeding towards the fixing portion 11:

an annular radial region 25a, adjacent and parallel to the end section of the fixing portion 13 adjacent to the axial end 7 of the gasket 1 and connected to the fixing portion 13 by means of a curved elbow portion; and a radial region 25b facing the radial and end portions 23, 24 of the support ring 10 and extending towards the fixing portion 11 from one end of the axial region 25a opposite to the one connected to the fixing portion 13.

The elastomeric element 14 comprises:

an annular axial portion 26, radially interposed between the fixing portion 11 of the support ring 10 and the member 4 and extending from the shoulder 21b towards the axial end 8 of the gasket 1;

an annular radial portion 27, covering the radial portion 23 of the support ring 10 on the side facing the axial end 8; and an annular free end portion 28 covering entirely, on all sides, the end portion 24 of the support ring 10.

The axial portion 26 of the elastomeric element 14 defines a static seal between the gasket 1 and the member 4.

The radial portion 27 defines an annular shoulder 27a facing the fixing portion 13 of the support ring 12 and able to house the wiper member 18, as better explained in greater detail below; as shown in particular in FIG. 2, the shoulder 27a determines a reduction of the axial thickness of the elastomeric element 14 towards increasing diameters with respect to the axis A.

Preferably, the sealing lips 15 are two in number and overhangingly extend from the end portion 28 of the elastomeric element 14 for cooperating with a radially inner delimiting surface 29 of the fixing portion 13 of the support ring 12, facing the fixing portion 11 of the support ring 10.

Both of the sealing lips 15 have truncated-conical shapes with increasing diameter towards the axial end 8 of the gasket 1.

The elastomeric element 14 defines, at the end portion 28 and on the side facing the axial end 7 of the gasket 1, an axial shock-absorbing pad 37 to contact in use the radial region 25b of the support ring 12. Such shock-absorbing pad 37 provides an additional barrier to the passage of external contaminants from the ambient 6 to the ambient 5.

In the embodiment shown in FIGS. 1 and 2, the wiper member 18 includes:

an annular support ring 30, in particular made of a rigid material, preferably of metal, directly fixed, for example by gluing, to the radial portion 27 of the elastomeric element 14; and an annular contact element 31 overhangingly carried by the support ring 30, defining the wiping portion 20 and made of polyurethane material.

According to a possible alternative not shown, the contact element 31 could also be made of an elastomeric material.

In more detail, the support ring 30 comprises:

an annular radial portion 30a, directly fixed to the region of the radial portion 27 of the elastomeric element 14 extending from the shoulder 27a towards increasing diameters with respect to the axis A; and a truncated-conical portion 30b extending towards the axial end 8 of the gasket 1 and towards the fixing portion 13 of the support ring 12 starting from the radial portion 30a having the largest diameter.

The truncated-conical portion 30b has a diameter increasing towards the axial end 8 of the gasket 1 and is connected to the radial portion 30a by means of a curved section.

The contact element 31 is directly fixed on the truncated-conical portion 30b of the support ring 30 and defines an annular truncated-conical contact lip 32 with a diameter increasing towards the axial end 8 of the gasket 1.

The contact lip 32 of the wiper member 18 is axially interposed between the axial end 8 of the gasket 1 and the sealing lips 15.

The elastomeric element 16 comprises:

an annular shaped portion 35 covering the axial and radial regions 25a, 25b of the protruding portion 25 of the support ring 12 on the side facing the axial end 7 of the gasket 1; and an annular free end portion 36 covering on both sides the free end of the radial region 25b of the protruding portion 25 and overhangingly projecting from this latter towards the axial end 7 of the gasket 1.

In particular, the shaped portion 35, in the area adjacent to the fixing portion 13, extends until it cooperates in abutment with the shoulder 22a of the support ring 22a and defines a static seal between the gasket 1 and the member 3.

The end portion 36 is overhangingly provided with a single annular sealing lip 17 for the lubricant in the ambient 5, which is pressed onto the fixing portion 11 of the support ring 10 by an annular spring 38.

The end portion 36 has a further annular sealing lip 39 against external contaminants, axially interposed between the sealing lip 17 and the radial portion 23 of the support ring 10 and cooperating with this latter. More precisely, the sealing lip 39 overhangingly extends from the end portion 36 towards the radial portion 23 of the support ring 10.

The sealing lip 39 also has a truncated-conical shape with a diameter increasing towards the radial portion 23 of the support ring 10 and, therefore, towards the axial end 8 of the gasket 1.

The sealing lips 15, 17, 39 and the contact lip 32 define the dynamic seals between the moving part of the gasket 1 (in the shown example, the support ring 10, the elastomeric element 14 and the wiper member 18) and the fixed part (in the shown example, the support ring 12 and the elastomeric element 16).

Figure 3:
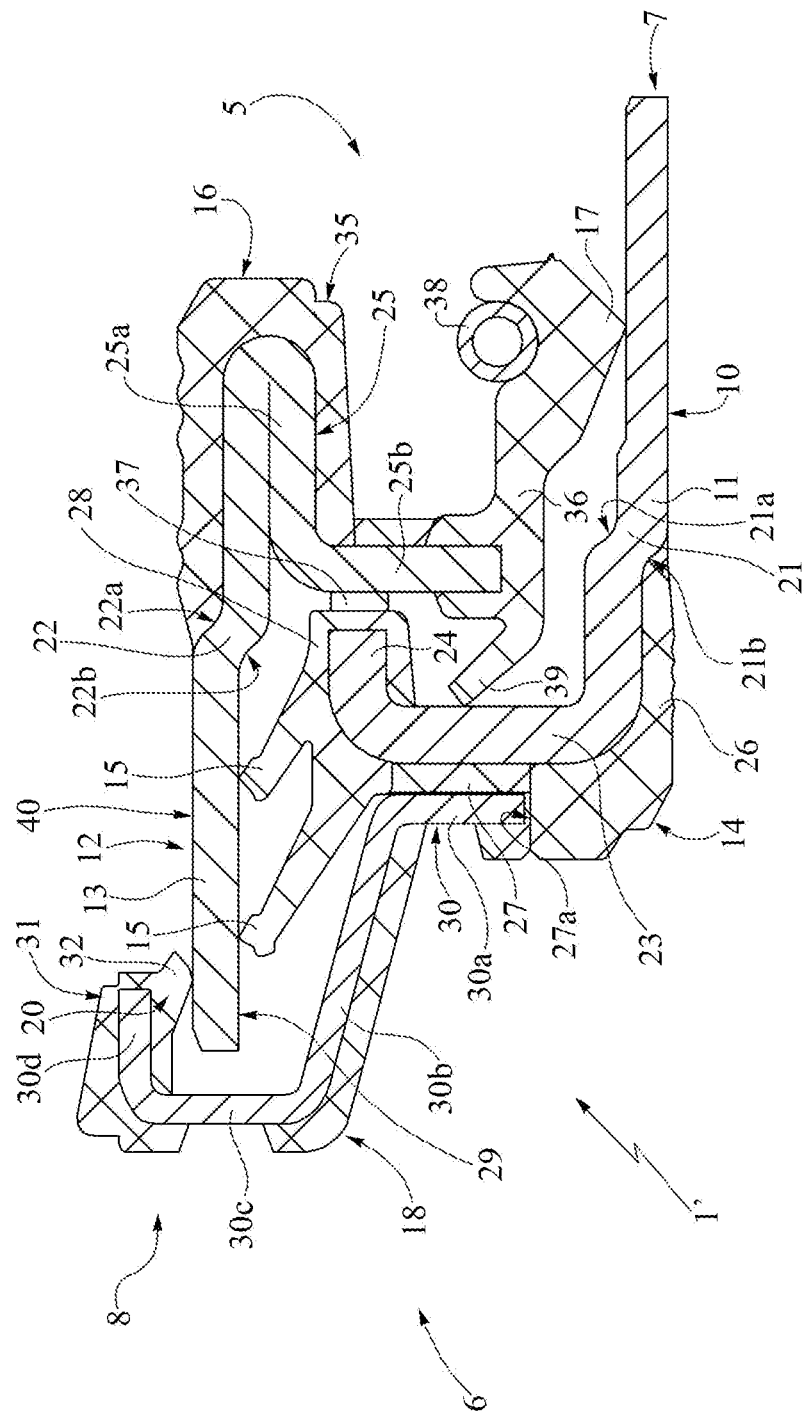
FIGS. 3 and 4 are half-sections, analogous to FIG. 2 and illustrating further embodiments of the gasket according to the present invention.

In FIG. 3, 1' indicates as a whole a different embodiment of a gasket according to the present invention, suitable to be housed in the compartment 2 to prevent the passage of lubricant from the ambient 5 to the ambient 6 and to hinder the passage of external contaminants from the ambient 6 to the ambient 5; the gasket 1' is described hereinafter only insofar as it differs from the gasket 1, indicating with the same reference numbers parts identical or equivalent to parts already described.

In particular, the gasket 1' differs from the gasket 1 essentially because the wiping portion 20, and therefore the contact lip 32, cooperate with a radially outer delimiting surface 40 of the fixing portion 13 of the support ring 12, opposite to the delimiting surface 29.

In this case, the wiper member 18 defines the axial end 8 of the gasket 1, is folded around an axial end of the fixing portion 13 of the support ring 12 adjacent to the axial end 8 and contacts the fixing portion 13 along the delimiting surface 40.

In more detail, the support ring 30 further comprises:
an annular radial portion 30c, which extends towards increasing diameters from the end of the truncated-conical portion 30b opposite to the one connected to the radial portion 30a and faces the axial end of the fixing portion 13 of the support ring 12 adjacent to the axial end 8; and
an annular axial end portion 30d extending parallel to the axis A towards the axial end 7 and radially more external than the fixing portion 13 of the support ring 12.

Even in this case, the contact element 31 is carried by the support ring 30 and protrudes, with its contact lip 32, from the end portion 30d to cooperate with the delimiting surface 40 of the fixing portion 13 of the support ring 12.

Thanks to the particular shape of the wiper member 18, which in a certain sense "encloses" the end of the fixing portion 13 of the support ring 12 adjacent to the ambient 6, the barrier created against external contaminants at the entry of this ambient is particularly effective.

Figure 4:
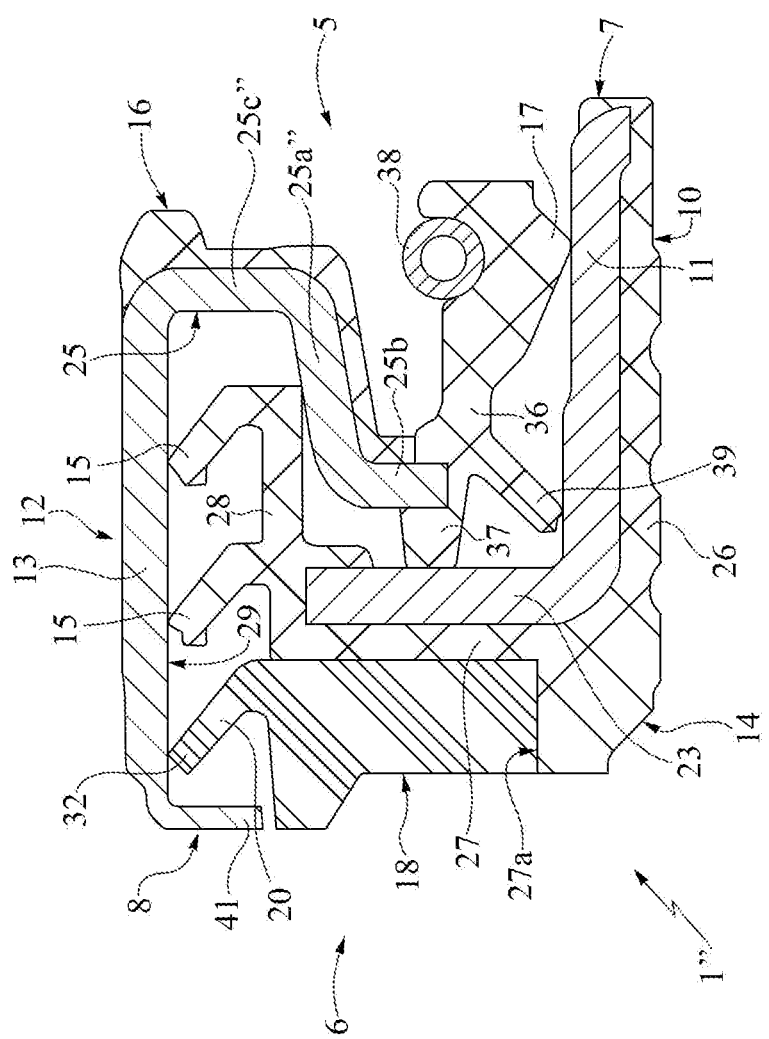

In FIG. 4, 1" indicates as a whole a different embodiment of a gasket according to the present invention, suitable to be housed in the compartment 2 to prevent the passage of lubricant from the ambient 5 to the ambient 6 and to hinder the passage of external contaminants from the ambient 6 to the ambient 5; the gasket 1" is described hereinafter only insofar as it differs from the gasket 1, indicating with the same reference numbers parts equal or equivalent to parts already described.

In particular, the gasket 1" differs from the gasket 1 essentially because the wiper member 18 is entirely made of polyurethane material.

According to a possible alternative not shown, the wiper member 18 may be entirely made of elastomeric material.

In the gasket 1", the support ring 12 also comprises a radial annular portion 41, which overhangingly extends from one end of the fixing portion 13 opposite to the one from which the protruding portion 25 extends and has, in the radial direction with respect to the axis A, an extension smaller than the protruding portion 25. The radial portion 41 extends in a position facing the contact lip 32 of the wiper member 18 to create, also in this case, a particularly effective barrier against external contaminants from the ambient 6.

The protruding portion 25 of the gasket 1" has a slightly different shape from the one of the protruding portion 25 of the gasket 1; in particular, in this case, the axial region 25a is replaced by a truncated-conical region 25a" having a diameter decreasing towards the radial portion 23 of the support ring 10, and a radial region 25c" is provided between the truncated-conical region 25a" and the fixing portion 13. Moreover, the sealing lip 15 closest to the axial end 7 of the gasket 1" also cooperates with the truncated-conical region 25a" of the protruding portion 25 of the support ring 12.

In this solution, the support ring 10 lacks the axial end portion 24.

In this case, the shock-absorbing pad 37 is carried by the free end portion 36 of the elastomeric element 16 and contacts, in use, the radial portion 23 of the support ring 10.

Finally, the sealing lip 39 cooperates, in this solution, with the fixing portion 11 of the support ring 10 and has a truncated-conical shape with decreasing diameters towards the axial end 8.

In use, any external contaminant coming from the ambient 6 should overcome in sequence the barriers represented by the contact lip 32 of the wiper member 18, by the sealing lips 15, by the shock-absorbing pad 37 and by the sealing lips 39 and 17 before reaching the ambient 5.

All the shown embodiments allow to use a different material for the wiper member 18 with respect to the other materials present in the gaskets 1, 1', 1", thus allowing to focus on the needs of the application. For example, a barrier to external contaminants coming from the ambient 6 often requires to be made of a hard material to be more effective; this is obviously very different from what it is required from a barrier to the ambient 5, containing oil at high temperatures, where highly flexible materials are preferred.

Thanks to the fact that each support ring 10, 12 is made in one piece, it is possible to obtain a simpler production process, a reduction in the overall number of components and in the related production costs; furthermore, since each support rings 10, 12 is not obtained as an assembly of two or more components, there is no risk of bypassing external contaminants through the contact surfaces between such components.

Moreover, the gaskets 1, 1', 1" are all suitable for applications where a reduced axial play is provided between the members 3 and 4.

Furthermore, please note how the different solutions here described and shown guarantee, if compared to the known solutions, a substantial increase in the number of working hours of the gaskets 1, 1', 1" under severe conditions, namely on excavators or operating machines, typically working for example on muddy terrain.

In the particular solution of FIG. 3, thanks to the shape of the wiper member 18, which turns around the axial end of the fixing portion 13 of the support ring 12 adjacent to the ambient 6, the direct access of external contaminants from this latter ambient to the inside of the gasket 1' is avoided. Also the solution of FIG. 4 gives the same advantage thanks to the presence of the radial portion 41 facing the contact lip 32 of the wiper member 18 and, therefore, arranged between the contact lip 32 and the ambient 6.

Finally, it is clear that the gaskets 1, 1', 1" here described and shown can be subject to modifications and variations without departing from the scope of protection defined by the appended claims.

What is claimed is:

1. A gasket for sealing a compartment between two members, one fixed and the other rotating, so as to prevent the passage of lubricant from a first ambient to a second ambient arranged on opposite sides of said compartment, and to at least hinder the passage of external contaminants from said second ambient to said first ambient; said gasket having an annular configuration about a middle axis and having a first and a second axial opposite end, adapted to be arranged, in use, facing said first and second ambient, respectively; said gasket comprising:
a first support ring made of rigid material having a first annular fixing portion, adapted to be connected, in use, to a first of said members;
a second support ring made of rigid material made in one single piece, having a second annular fixing portion radially more external than said first fixing portion and adapted to be connected, in use, to a second of said members;
a first annular elastomeric element carried by the first support ring and defining at least a first annular sealing lip cooperating with said second fixing portion of said second support ring to counter, in use, the passage of external contaminants from said second ambient to said first ambient;
a second annular elastomeric element carried by the second support ring and defining at least a second annular sealing lip cooperating with the first fixing portion of said first support ring to counter, in use, the passage of lubricant from said first ambient to said second ambient;
wherein the gasket also comprises an annular wiper member, distinct from the first elastomeric element, connected to said first elastomeric element and having a wiping portion contacting said second fixing portion of said second support ring to counter, in use, the passage of external contaminants from said second ambient to said first sealing lip.

2. The gasket according to claim 1, wherein said first and second fixing portions essentially extend in parallel to said axis.

3. The gasket according to claim 1, wherein said second fixing portion of said second support ring has a radially inner delimiting surface facing said first support ring; and
wherein said wiping portion and said first sealing lip cooperate with said radially inner delimiting surface.

4. The gasket according to claim 1, wherein said second fixing portion of said second support ring is delimited on opposite sides by a radially inner delimiting surface, facing said first support ring, and by a radially outer surface;
wherein said first sealing lip cooperates with said radially inner delimiting surface; and
wherein said wiping portion cooperates with said radially outer surface.

5. The gasket according to claim 4, wherein said wiper member defines said second axial end of the gasket, is bent around an axial end of said second fixing portion adjacent to said second axial end and contacts said second fixing portion along said radially outer delimiting surface.

6. The gasket according to claim 1, wherein said first support ring comprises an annular radial portion overhangingly extending towards said second fixing portion of said second support ring starting from said first fixing portion and covered, at least partially, by said first elastomeric element on the side facing the second axial end of the gasket; and
wherein said wiper member is fixed to the part of said first elastomeric element covering said radial portion of said first support ring.

7. The gasket according to claim 6, wherein said wiper member comprises:
a third support ring made of rigid material directly fixed to the part of said first elastomeric element covering said radial portion of said first support ring; and
an annular contact element carried by said third support ring, defining said wiping portion and made of polyurethane or elastomeric material.

8. The gasket according to claim 6, wherein said wiper member is completely made of polyurethane or elastomeric material.

9. The gasket according to claim 1, wherein said first sealing lip has a truncated-conical shape having a diameter increasing towards the second axial end of the gasket; and
wherein said wiping portion of said wiper member defines a truncated-conical annular contact lip with a diameter increasing towards the second axial end of the gasket.

10. The gasket according to claim 1, wherein said wiping portion of said wiper member is axially interposed between the second axial end of the gasket and said first sealing lip.

11. The gasket according to claim 1, wherein the first annular sealing lip contacts the second fixing portion at a first contact and the wiping portion contacts said second fixing portion at a second contact, whereby the first contact is radially offset from the middle axis by a first distance and the second contact is radially offset from the middle axis by a second distance, whereby the first and second distance are substantially equal.

12. The gasket according to claim 1, wherein the first annular sealing lip contacts the second fixing portion at a first contact and the wiping portion contacts said second fixing portion at a second contact, whereby the first contact is radially offset from the middle axis by a first distance and the second contact is radially offset from the middle axis by a second distance, whereby the second distance is greater than the first distance.

13. A gasket for sealing a compartment between two members, one fixed and the other rotating, the gasket having an annular configuration about a middle axis, the gasket comprising:
a first support ring having a first annular fixing portion;
a second support ring made in one single piece, having a second annular fixing portion radially more external than said first fixing portion;
a first annular elastomeric element carried by the first support ring and defining at least a first annular sealing lip cooperating with said second fixing portion of said second support;
a second annular elastomeric element carried by the second support ring and defining at least a second annular sealing lip cooperating with the first fixing portion of said first support ring;

wherein the gasket also comprises an annular wiper member, distinct from the first elastomeric element, connected to said first elastomeric element and having a wiping portion contacting said second fixing portion of said second support ring.

14. The gasket according to claim 13, wherein the first annular sealing lip contacts the second fixing portion at a first contact and the wiping portion contacts said second fixing portion at a second contact, whereby the first contact is radially offset from the middle axis by a first distance and the second contact is radially offset from the middle axis by a second distance, whereby the first and second distance are substantially equal.

15. The gasket according to claim 14, wherein said second fixing portion of said second support ring has a radially inner surface facing said first support ring, the radially inner surface terminating at a distal edge that is radially offset from the middle axis by a third distance, whereby the third distance and the first distance is substantially equal.

16. The gasket according to claim 13, wherein the first annular sealing lip contacts the second fixing portion at a first contact and the wiping portion contacts said second fixing portion at a second contact, whereby the first contact is radially offset from the middle axis by a first distance and the second contact is radially offset from the middle axis by a second distance, whereby the second distance is greater than the first distance.

17. A gasket for sealing a compartment between two members, one fixed and the other rotating, the gasket having an annular configuration about a middle axis, the gasket comprising:

a first support ring having a first annular fixing portion;

a second support ring having a second annular fixing portion radially more external than said first fixing portion;

a first annular elastomeric element carried by the first support ring and defining at least a first annular sealing lip cooperating with said second fixing portion of said second support;

a second annular elastomeric element carried by the second support ring and defining at least a second annular sealing lip contacting the first fixing portion of said first support ring at a first contact that is radially offset from the middle axis by a first distance;

wherein the gasket also comprises an annular wiper member connected to said first elastomeric element and having a wiping portion contacting said second fixing portion of said second support ring at a second contact that is radially offset from the middle axis by a second distance; and wherein the first distance and the second distance are substantially equal.

18. The gasket according to claim 17, wherein said second fixing portion of said second support ring has a radially inner surface facing said first support ring, the radially inner surface terminating at an edge that is radially offset from the middle axis by a third distance, wherein the third distance is substantially equal to the first distance.

19. The gasket according to claim 17, wherein the second support ring made in one single piece.

* * * * *